US008375992B2

(12) United States Patent
Reilly et al.

(10) Patent No.: US 8,375,992 B2
(45) Date of Patent: Feb. 19, 2013

(54) ADJUSTABLE PRESSURE CONTROL VALVES

(75) Inventors: Joseph Patrick Reilly, Grayslake, IL (US); J. Eric Haggard, South Elgin, IL (US); Charles Edward DiVincenzo, Crystal Lake, IL (US)

(73) Assignee: Parker-Hannifin Corporation, Cleveland, OH (US)

( * ) Notice: Subject to any disclaimer, the term of this patent is extended or adjusted under 35 U.S.C. 154(b) by 1058 days.

(21) Appl. No.: 12/097,614

(22) PCT Filed: Dec. 15, 2006

(86) PCT No.: PCT/US2006/062137
§ 371 (c)(1),
(2), (4) Date: Oct. 27, 2008

(87) PCT Pub. No.: WO2007/102912
PCT Pub. Date: Sep. 13, 2007

(65) Prior Publication Data
US 2009/0090882 A1 Apr. 9, 2009

Related U.S. Application Data

(60) Provisional application No. 60/750,492, filed on Dec. 15, 2005.

(51) Int. Cl.
*F15B 13/043* (2006.01)
(52) U.S. Cl. .................. 137/625.64; 137/596.16; 137/14
(58) Field of Classification Search ............ 137/625.64, 137/596.16, 14; 251/30.01, 30.04
See application file for complete search history.

(56) References Cited

U.S. PATENT DOCUMENTS

| 4,605,197 | A | * | 8/1986 | Casey et al. ............. 251/30.01 |
| 4,997,004 | A | | 3/1991 | Barkhimer |
| 5,312,050 | A | * | 5/1994 | Schumann et al. ...... 251/129.18 |
| 5,597,015 | A | | 1/1997 | Asou et al. |
| 5,915,665 | A | * | 6/1999 | Paese et al. ............. 251/30.04 |
| 6,109,298 | A | | 8/2000 | Kaneko et al. |
| 6,142,394 | A | | 11/2000 | Hefler et al. |
| 6,286,535 | B1 | | 9/2001 | Harms et al. |
| 6,679,231 | B2 | | 1/2004 | Kabet et al. |
| 6,953,183 | B2 | | 10/2005 | Uryu et al. |

(Continued)

FOREIGN PATENT DOCUMENTS

| FR | 331 979 | 10/1903 |
| GB | 881 308 | 11/1961 |

(Continued)

*Primary Examiner* — Craig Schneider
*Assistant Examiner* — Craig J Price
(74) *Attorney, Agent, or Firm* — Renner, Otto, Boisselle & Sklar, LLP

(57) ABSTRACT

A solenoid operated valve and method of assembly characterized by a threaded connection between the pole piece (69) and the cage (11), the threaded connection (75) including a first threaded connecting portion fixed in relation to the pole piece and a second threaded connecting portion fixed in relation to the cage and in threaded engagement with the first threaded portion such that relative rotation of the first and second threaded portions would vary the axial spacing between the proximal end of the pole piece and the valve seat (38) over a range of adjustment; and an anti-rotation device interposed between the first and second threaded connecting portions for locking the first and second threaded connecting portions against relative rotation to fix the axial spacing between the proximal end of the pole piece and the valve seat within such range of adjustment, which axial spacing regulates the maximum pressure that can be supplied to the control port (25).

15 Claims, 5 Drawing Sheets

U.S. PATENT DOCUMENTS

| | | | |
|---|---|---|---|
| 6,957,656 B2 | 10/2005 | Tochiyama et al. | |
| 7,779,853 B2 * | 8/2010 | Reilly et al. | 137/14 |
| 2005/0139273 A1 * | 6/2005 | Morselli | 137/625.64 |
| 2007/0157980 A1 * | 7/2007 | Stephenson et al. | 137/625.64 |

FOREIGN PATENT DOCUMENTS

| | | |
|---|---|---|
| JP | 355112466 | 8/1980 |
| WO | 2005/083542 | 9/2005 |

* cited by examiner

ADJUSTABLE PRESSURE CONTROL VALVES

RELATED APPLICATION

This application is a national phase of International Application No. PCT/US06/062137 filed Dec. 15, 2006 and published in the English language.

This application claims the benefit of U.S. Provisional Application No. 60/750,492 filed Dec. 15, 2005, which is hereby incorporated herein by reference in its entirety.

FIELD OF THE INVENTION

The invention herein described relates generally to hydraulic control devices and, more particularly, to electrically controlled hydraulic valves.

BACKGROUND

Proportional pressure control valves heretofore have been used for a variety of applications including the control of clutches in an electro-hydraulic transmissions. In such electro-hydraulic transmissions, a hydraulic pump supplies pressurized hydraulic fluid for energizing a hydraulic actuator, for example a piston or a bellows, that directly operates the clutch. In one design for such a clutch, springs hold the clutch in its disengaged position and a carefully controlled pressure of the hydraulic fluid from the pump overcomes the springs' force to effect engagement of the clutch. When the hydraulic pressure is removed from this clutch, the springs once again move the clutch into its disengaged state.

SUMMARY OF THE INVENTION

The present invention provides a solenoid operated valve having one or more unique characteristics herein discussed in greater detail.

According to one aspect of the invention, a solenoid operated valve comprises:

a hollow cage configured for insertion into a port block having an inlet passage to which hydraulic fluid can be supplied under pressure from a pump, a control passage for supplying pressurized fluid from the inlet passage to a controlled device under the control of the valve, and a return passage for returning fluid to a tank or return line; the cage having axially spaced apart inlet, control and tank ports respectively for connecting to the inlet passage, control passage and tank passage;

a spool slidable axially within the cage for controlling a flow of hydraulic fluid from the inlet port to the control port, the spool including a control pressure surface exposed to a control chamber to which pressure may be applied for urging the spool to move within the cage from a position blocking flow from the inlet port to the control port to a position in which the spool allows flow of hydraulic fluid to pass from the inlet port to the control port;

a pilot valve supply passage allowing a flow of hydraulic fluid from the inlet port to the control chamber and a discharge passage for flow of hydraulic fluid from the control chamber through a valve seat, the valve seat being fixed in relation to the cage;

a pilot valve member movable into and out of engagement with the valve seat for closing and opening a passage through the valve seat to block or permit flow from the control chamber;

a solenoid plunger configured to be axially movable under the magnetic influence of a solenoid coil toward the valve seat;

a pole piece having a proximal end to which the solenoid plunger is drawn under the magnetic influence of the solenoid coil;

a pusher member interposed between the pilot valve member and the solenoid plunger for biasing the valve member against the valve seat when the solenoid plunger is acted upon by the magnetic influence of the solenoid coil at a given energization, the biasing force acting on the valve member determining the maximum pressure that can be obtained in the control chamber without unseating the pilot valve member from the valve seat;

a threaded connection between the pole piece and the cage, the threaded connection including a first threaded connecting portion fixed in relation to the pole piece and a second threaded connecting portion fixed in relation to the cage and in threaded engagement with the first threaded portion such that relative rotation of the first and second threaded portions would vary the axial spacing between the proximal end of the pole piece and the valve seat over a range of adjustment; and an anti-rotation device interposed between the first and second threaded connecting portions for locking the first and second threaded connecting portions against relative rotation to fix the axial spacing between the proximal end of the pole piece and the valve seat within such range of adjustment, which axial spacing regulates the maximum pressure that can be supplied to the control port.

In one particular embodiment configured for use as a proportional pressure control cartridge valve, the pusher member includes a pin member interposed between the pilot valve member and the solenoid plunger. The pin member has an axial length such that a minimum gap will be formed between the solenoid plunger and the proximal end of the pole piece when the valve member is seated against the valve seat. When the solenoid plunger is acted upon by the magnetic influence of the solenoid coil at a given energization, the axial width of the gap will determine the level of magnetic attraction between the solenoid plunger and the pole piece and thus the level of force applied by the pin member against the valve member in the direction of the valve seat. This in turn will determine the maximum pressure that can be obtained in the control chamber without unseating the pilot valve member from the valve seat. Relative rotation of the first and second threaded connecting portions would vary the axial spacing between the proximal end of the pole piece and the valve seat and thereby vary the width of the gap between the solenoid plunger and the proximal end of the pole piece over a range of adjustment. The anti-rotation device locks the first and second threaded connecting portions against relative rotation to provide a gap width within such range of adjustment, which gap width regulates the maximum pressure that can be supplied to the control port.

In another particular embodiment configured for use as a pressure reducing solenoid valve, the pusher member is a spring and the solenoid plunger under the magnetic influence of the solenoid coil latches against the proximal end of the pole piece. Rotation of the first and second threaded portions would vary the axial spacing between the proximal end of the pole piece and the valve seat and thereby vary the compression of the spring when the solenoid plunger is clamped against the pole piece over a range of adjustment; and the anti-rotation device locks the first and second threaded connecting portions against relative rotation to fix the spacing within such range of adjustment, which spacing regulates the maximum pressure that can be supplied to the control port.

A valve according to the invention may be further characterized by the second threaded connecting portion having a radially outwardly opening groove and the first threaded connecting portion having a reduced thickness, axial projection radially outwardly aligned with the groove. The anti-rotation device may be formed by a portion of the axial projection deformed radially inwardly into the groove to create a mechanical interference preventing the first and second threaded connecting portions from rotating relative to one another.

The pole piece may be formed by a tubular end portion of an adapter, and the first threaded connecting portion may be formed by an internally threaded portion of the adapter.

The second threaded connecting portion may be formed by an externally threaded portion of the cage.

The valve seat may have a portion thereof threaded into an internally threaded open axial end portion of the cage, with an axial end of the valve seat defining an axial side of the control chamber.

The pilot valve supply passage may include an orifice for producing a pressure drop across the orifice in the flow passing from the inlet port to the control chamber.

According to another aspect of the invention, there is provided a method of presetting the limit pressure of the valve. The method comprises the steps of placing the valve in a test fixture; supplying pressurized hydraulic fluid to the inlet port; moving the solenoid plunger to its position closest to the valve seat; measuring the pressure at the control port; relatively rotating the first and second threaded connecting portions until the measured pressure at the control port equals the desired limit pressure; and then fixing the first and second threaded connecting portions against relative rotation.

According to a further aspect of the invention, a solenoid operated valve comprises:
a valve body having axially spaced apart inlet, control and tank ports respectively for connecting to an inlet passage, a control passage and a tank passage;
a spool slidable axially within the valve body for controlling a flow of hydraulic fluid from the inlet port to the control port, the spool including a control pressure surface exposed to a control chamber to which pressure may be applied for urging the spool to move within the cage from a position blocking flow from the inlet port to the control port to a position in which the spool allows flow of hydraulic fluid to pass from the inlet port to the control port;
a pilot valve supply passage allowing a flow of hydraulic fluid from the inlet port to the control chamber and a discharge passage for flow of hydraulic fluid from the control chamber through a valve seat, the valve seat being fixed in relation to the cage;
a pilot valve member movable into and out of engagement with the valve seat for closing and opening a passage through the valve seat to block or permit flow from the control chamber;
a solenoid plunger configured to be axially movable under the magnetic influence of a solenoid coil toward the valve seat;
a pole piece having a proximal end to which the solenoid plunger is drawn under the magnetic influence of the solenoid coil from a position spaced from the pole piece to a position latched to the pole piece;
a spring interposed between the pilot valve member and the solenoid plunger for biasing the valve member against the valve seat when the solenoid plunger is acted upon by the magnetic influence of the solenoid coil at a given energization, the biasing force acting on the valve member determining the maximum pressure that can be obtained in the control chamber without unseating the pilot valve member from the valve seat.

In a particular embodiment, the solenoid plunger, when not subjected to the magnetic influence of the solenoid coil, is movable away from the pole piece a distance such that the spring will not be compressed between the solenoid plunger and pilot valve member.

The pole piece may include an axial hole through which the spring extends, and the spring may be a coil spring having a diameter slightly less than the diameter of the axial hole in its uncompressed state.

According to still another embodiment of the invention, a valve comprises a valve body, a movable valve member, and a solenoid for moving the valve member relative to the valve body, the solenoid including a coil, terminals having externally exposed portions, and electrical connections between the coil and terminals, wherein the electrical connections are encased in an over-molded body sealing the electrical connections.

The foregoing and other features of the invention are hereinafter more fully described and particularly pointed out in the claims, the following description setting forth in detail certain illustrative embodiments of the invention, these being indicative, however, of but a few of the various ways in which the principles of the invention may be employed.

BRIEF DESCRIPTION OF THE DRAWINGS

In the annexed drawings.

DETAILED DESCRIPTION

Figure 1:
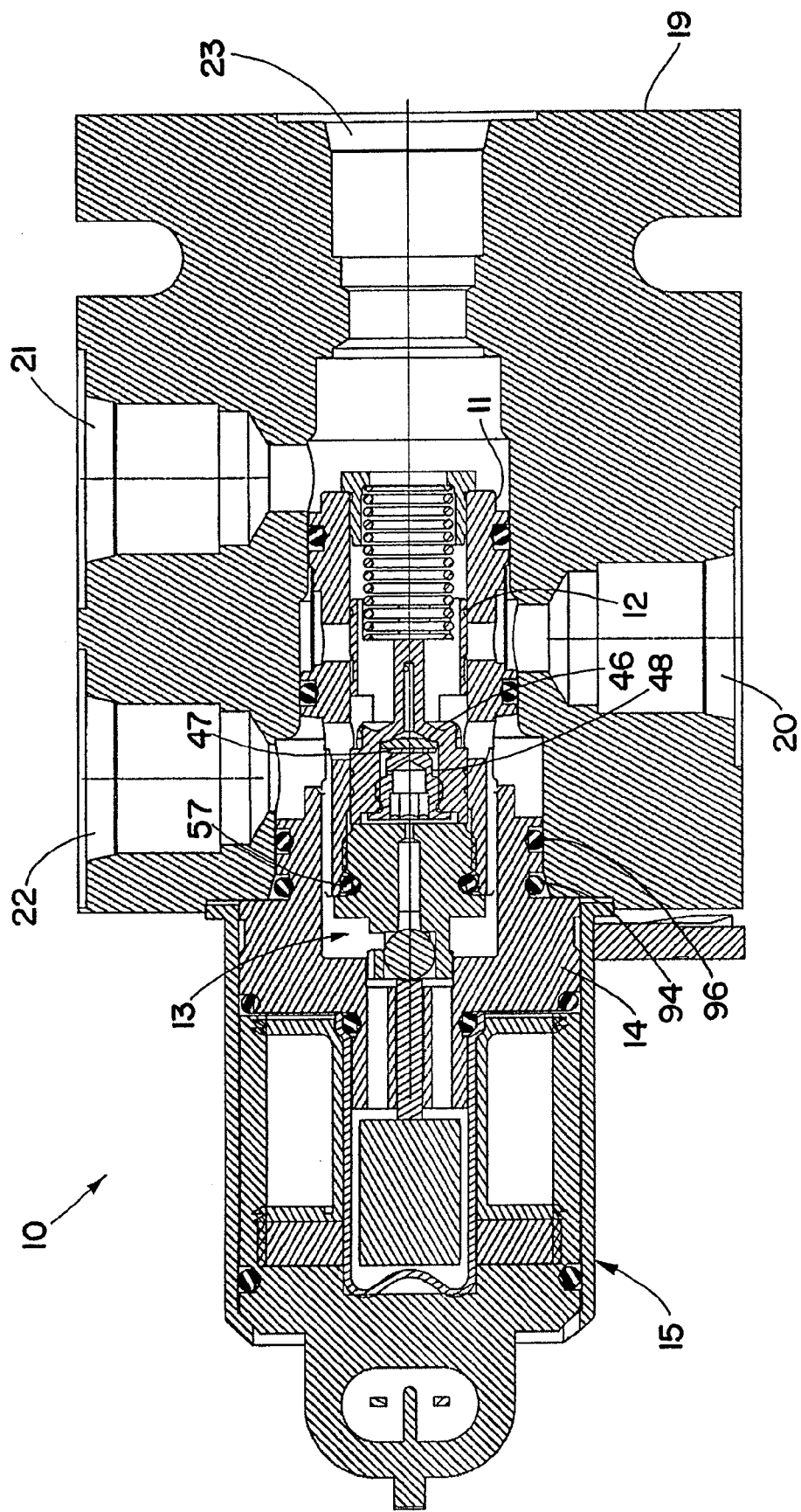
FIG. 1 is a cross-sectional view of an exemplary adjustable limit pressure control valve according to the invention, shown installed in a port body and configured for use as a proportional pressure control valve.
Figure 2:
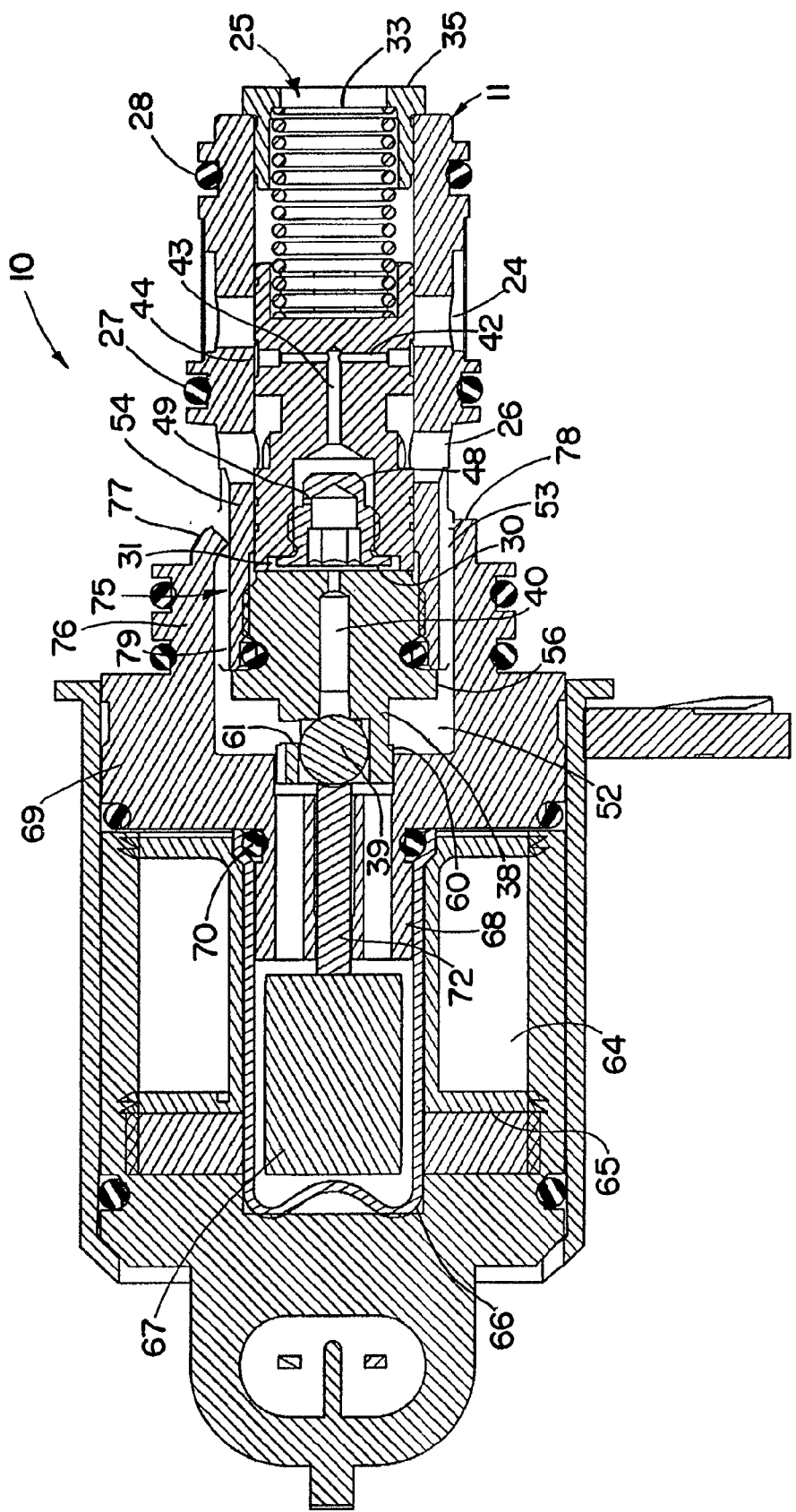
FIG. 2 is a cross-sectional view of the valve of FIG. 1 separated from the port body.

Referring now in detail to the drawings and initially to FIGS. 1 and 2, an exemplary solenoid operated valve according to the invention is indicated generally by reference numeral 10. The valve 10, shown as a cartridge valve, generally comprises a hollow cage 11, a spool 12 slidable axially within the cage, a pilot valve 13, a pole piece adapter 14, and a solenoid 15.

The hollow cage 11 is configured for insertion into a port block 19 having an inlet passage 20 to which hydraulic fluid can be supplied under pressure from a pump, a control passage 21 for supplying pressurized fluid from the inlet passage to a controlled device under the control of the valve 10, and a return/tank passage 22 for returning fluid to a tank or return line. In FIG. 1, an optional control passage 23 is axially aligned with the cage, whereas the control passage 21 extends transversely to the axis of the cage. Normally only one control passage will be provided, or if both are provided one may be plugged if desired.

The cage 11 has an inlet port 24 that may be covered by an annular screen, a control port 25 and a tank port 26 that are axially spaced apart. The inlet, control and tank ports connect with the inlet passage 20, control passage 21 and return/tank passage 22 when the cartridge valve 10 is inserted into the port block. The cage may be have annular grooves in its outer diameter surface for retaining annular seals 27 and 28 that seal the cage to the port body at strategic locations between the inlet, control and return/tank ports.

The spool 12 is slidable axially within the cage 11 for controlling a flow of hydraulic fluid from the inlet port 24 to the control port 25. The spool has a control pressure surface 30 exposed to a control chamber 31 to which pressure may be applied for urging the spool to move within the cage from a position blocking flow from the inlet port to the control port to a position in which the spool allows flow of hydraulic fluid to pass from the inlet port to the control port. In the illustrated embodiment the spool is biased by a spool spring 33 toward its closed position, i.e. its position blocking flow from the inlet port to the control port. The spool spring is interposed between an end of the spool opposite the control pressure surface 30 and a tubular plug 35 threaded into the axially inner end of the cage 11. The plug has a through passage forming the control port 25 which communicates with the interior of the spool.

The pilot valve 13 includes a pilot valve seat 38 and a valve member 39 movable into and out of engagement with the valve seat 38 for closing and opening a passage 40 through the valve seat to block or permit flow from the control chamber 31. A flow of hydraulic fluid is supplied from the inlet port 26 to the control chamber by a pilot valve supply passage. In the illustrated embodiment, the pilot valve supply passage includes a radial passage 42 in the spool that connects an axially extending center passage 43 in the spool to an annular relief 44 on the outer diameter of the spool that is in communication with the inlet port. The center passage extends to a chamber containing a screen 46 (FIG. 1, removed in FIG. 2) and an E-ring 47. The screen and E-ring are held in the chamber by an interchangeable orifice member 48 threaded into an internally threaded end portion of the spool. The orifice member includes an orifice 49 which reduces the flow rate of the hydraulic fluid flowing through the orifice. The E-ring 47 transfers the hydraulic load from the screen 46 to the orifice member 48 while allowing the hydraulic fluid to flow to the orifice.

From the orifice, the hydraulic flow passes to the control chamber 31. From the control chamber, the hydraulic flow passes through the passage 40 in the valve seat 38 and into a discharge flow passage 52 that communicates with the return/tank port 26 via axially extending grooves 53 in an externally threaded connecting portion 54 of the cage. The connecting portion 54 is also internally threaded for threaded receipt of the valve seat 38. The valve seat has an radially outwardly extending annular flange 56 that abuts against an axial end face of the cage to fix the position of the valve member in relation to the cage when the valve seat is tightened against the cage. As shown, an annular seal 57 may be provided to seal the valve seat to the cage.

The valve seat 38 has a tubular axial extension 60 in which the valve member 39 is constrained for axial movement into and out of engagement with the valve seat. The valve member may be a valve ball as shown. The tubular extension has a side port 61 for allowing flow exiting the valve member to flow to the axial passages 53 connecting to the return/tank port.

As seen at the left in FIGS. 1 and 2, the solenoid 15 comprises a solenoid coil 64 supported on a bobbin 65, a liner cup 66 inside the bobbin, a solenoid plunger 67 axially movable in the liner cup, and a pole piece 68 formed by a tubular part of a pole piece adapter 69 that is inserted in the open end of the liner cup and sealed to the liner cup by an annular seal 70. The solenoid plunger is configured to be axially movable under the magnetic influence of the solenoid coil toward and away from the valve seat 38. The pole piece has a proximal end to which the solenoid is drawn under the magnetic influence of the solenoid coil, as is well known in the art.

A pusher member 72 is interposed between the pilot valve member 39 and the solenoid plunger 67 for biasing the valve member against the valve seat 38 when the solenoid plunger is acted upon by the magnetic influence of the solenoid coil 64 at a given energization. The biasing force acting on the valve member determines the maximum pressure that can be obtained in the control chamber 31 without unseating the pilot valve member from the valve seat.

In the valve shown in FIGS. 1 and 2, the pusher member is a rigid pin that configures the valve for use as a proportional pressure control cartridge valve. The pin is guided in a guide hole in the pole piece adapter 69. The illustrated pin support has a cylindrical axial guide bore that may be stepped as shown.

The pin member 72 has an axial length such that a minimum gap will be formed between the solenoid plunger and the proximal end of the pole piece when the valve member is seated against the valve seat. When the solenoid plunger is acted upon by the magnetic influence of the solenoid coil at a given energization, the axial width of the gap will determine the level of magnetic attraction between the solenoid plunger and the pole piece and thus the level of force applied by the pin member against the valve member in the direction of the valve seat. To ensure precise engagement between the pin and valve ball, the end of the pin that engages the valve ball may have a spherical recess corresponding in radius to the radius of the ball.

When the valve ball 39 is not seated on the valve seat 38, pilot flow through the control chamber 31 will be at a relatively low pressure that is not sufficient to move the spool 12 against the biasing force of the spool spring 33. As energization of the solenoid is increased (e.g. through pulse-width current modulation), the plunger 67 will be drawn to the pole piece 68 with an increasing force, which in turn will move the valve ball against the valve seat. When the valve ball blocks flow through the valve seat, pressure will build up in the control chamber and move the spool a corresponding amount to the right in FIGS. 1 and 2, permitting corresponding throttled flow from the inlet port 24 to the control port 25. The spool will move until the pressure in the control chamber exceeds the plunger force acting on the valve ball, at which point the valve ball will move away from the valve seat to modulate flow through the control chamber until equilibrium is established. When the solenoid force reaches its rated maximum, the maximum force will be exerted by the solenoid against the valve ball. This will determine the maximum pressure that can be obtained in the control chamber without unseating the pilot valve member from the valve seat. The valve may be operated between this maximum pressure and zero pressure by varying the current applied to the solenoid coil, such as by pulse width modulation of the current, thereby providing proportional output pressure. Upon full energization, however, the limit pressure will be determined as a function of the gap width—the greater the gap the lower the limit pressure because the biasing force acting on the valve ball will be less.

As best seen in FIG. 2, a threaded connection 75 is provided between the pole piece adapter 69 and the cage 11. The threaded connection includes the previously mentioned externally threaded connecting portion 54 of the cage and a correspondingly internally threaded connecting portion 76 of the adapter. Consequently, relative rotation of the first and second threaded connecting portions varies the axial spacing between the proximal end of the pole piece and the valve seat, whereby the width of the gap between the solenoid plunger and the proximal end of the pole piece can be varied over a range of adjustment. By virtue of such rotation, the limit pressure of the valve can be easily adjusted, such as in a suitable test fixture that can supply hydraulic fluid to the valve and energize the solenoid to shift the valve toward the valve seat. Once adjusted to provided the desired set point, the threaded connection can then be locked against further relative rotation to fix the gap width by means of an anti-rotation device.

A preferred locking means is a mechanical crimp 77 whereby a portion of the adapter in deformed into a recess in the cage, or vice versa, to provide a mechanical interference preventing relative rotation of the threaded connecting portions. To this end, the threaded connecting portion of the adapter may be provided with a tubular extension 78 that radially outwardly overlaps axial grooves 79 provided in the external threads on the threaded connecting portion of the cage which grooves also form the passages 53 in the illustrated embodiment. The tubular extension may be of a reduced thickness to facilitate one or more portions thereof being mechanically deformed (crimped) into the grooves after the threaded connecting portions have been relatively rotated to provide the desired set point. The crimp may be effected by a radially movable pin provided in the test fixture for this purpose.

Thus it can be seen that the invention provides a valve assembly that is adjustable, i.e. the pressure output versus the input current applied to the solenoid can be tuned by the above described adjustment mechanism to satisfy, for example, a wide range of custom application output pressure ranges and performance slopes other than just a single pressure output or performance slope that was hard coded in prior designs, such as described in U.S. Pat. No. 6,286,535. The valve performance may be permanently fixed by the crimping, pressing or staking of the adapter into the groove or grooves of the cage after viewing and adjusting real time performance of the valve, and can essentially be infinitely tweaked until the desired performance is obtained. The valve performance can be matched essentially exactly from valve to valve in a production lot and across lots to achieve precise and duplicate performance characteristics. Prior art hard coded valves had broad distributions of performance curves within a production lot due to the nature of manufacturing tolerances.

Figure 3:
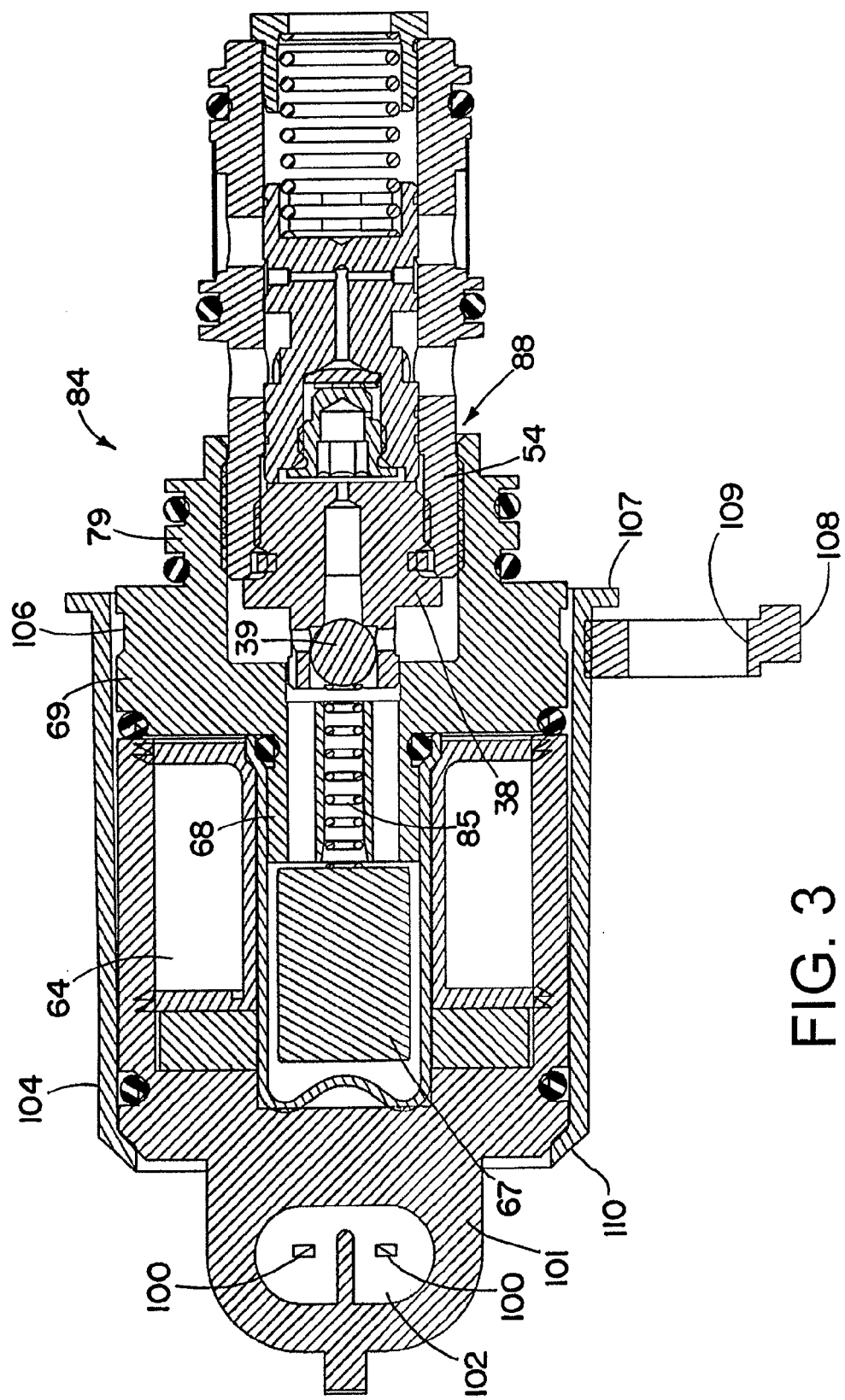
FIG. 3 is a cross-sectional view of another exemplary adjustable limit pressure control valve according to the invention, configured for use as a pressure reducing solenoid valve.

Referring now to FIG. 3, another valve according to the invention is designated generally by reference numeral 84. This valve is configured for use as a pressure reducing solenoid valve. This is effected by replacing the pin 72 of the valve 10 with a spring 85 that may be disposed within the guide bore in the pole piece adapter 69. Otherwise the valve components are essentially the same and the same reference numerals are used to designate like parts. A functional difference exists, however, the magnetic influence of the solenoid coil 64 causing the solenoid plunger 67 to latch against the proximal end of the pole piece 68. The spring will be correspondingly compressed to bias the valve ball against the valve seat. Thus, the valve operates in an on-off mode rather than as a proportional valve.

Rotation of the first and second threaded connecting portions 54 and 79 will vary the axial spacing between the proximal end of the pole piece and the valve seat and thereby vary the compression of the spring 85 when the solenoid plunger is clamped against the pole piece over a range of adjustment. In an exemplary embodiment, the energized and unenergized positions of the solenoid plunger may effect a preload on the valve ball 39 and an unloaded condition where no spring force is applied to the valve ball. That is, the solenoid plunger is free to move away from the pole piece 68 by an amount great enough to avoid compression of the spring.

The anti-rotation device 88 like that described above locks the first and second threaded connecting portions against relative rotation to fix the spacing within such range of adjustment, which spacing regulates the maximum pressure that can be supplied to the control port.

Figure 4:
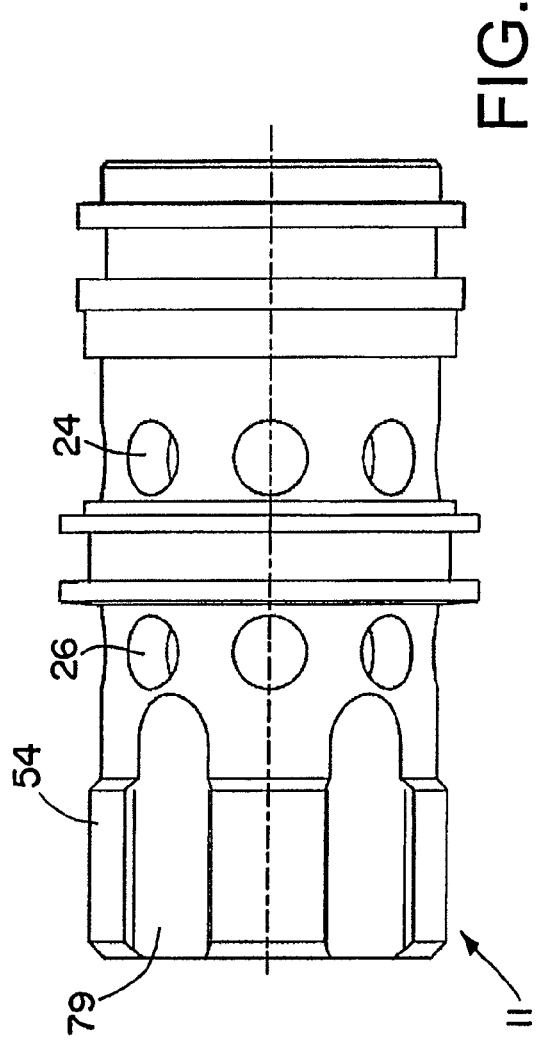
FIG. 4 is a side elevational view of a cage used in the valve of FIG. 3.
Figure 5:
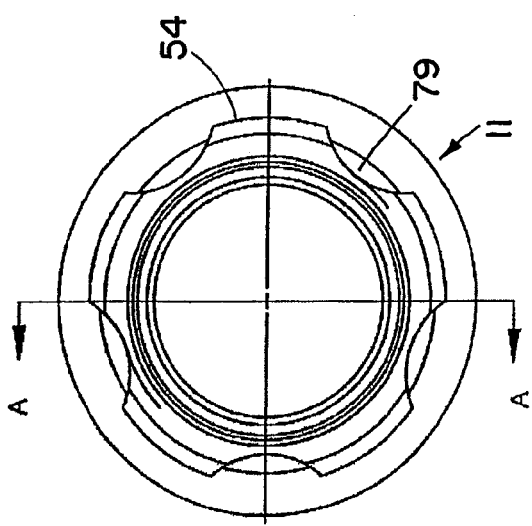
FIG. 5 is an end view of the cage of FIG. 4.
Figure 6:
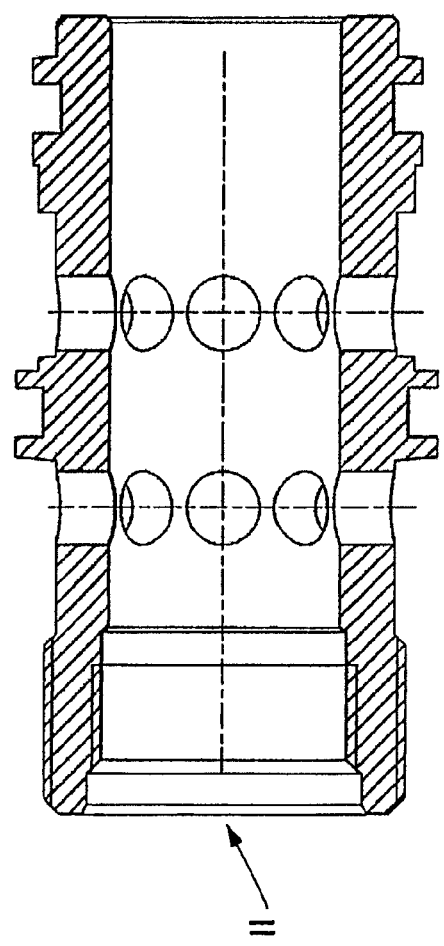
FIG. 6 is a cross-sectional view of the cage of FIG. 4, taken along the line A-A of FIG. 5.

In FIGS. 4-6, the cage 11 is shown in greater detail. In particular, the axial grooves 79 in the threaded connecting portion 54 of the cage can be better seen.

Figure 8:
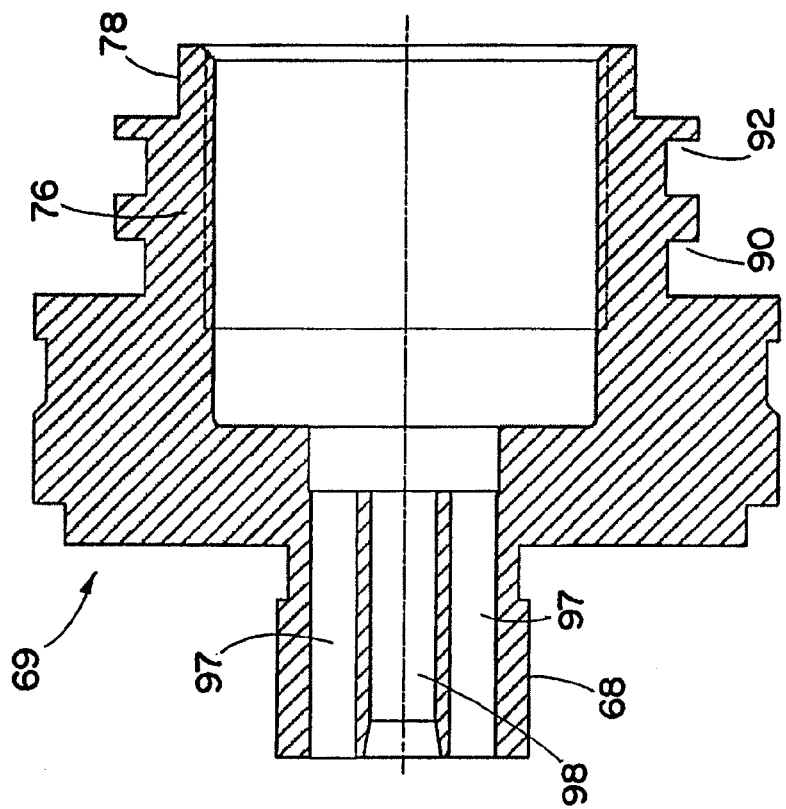
FIG. 8 is a cross-sectional view of the pole piece adapter, taken along the line B-B of FIG. 7.
Figure 7:
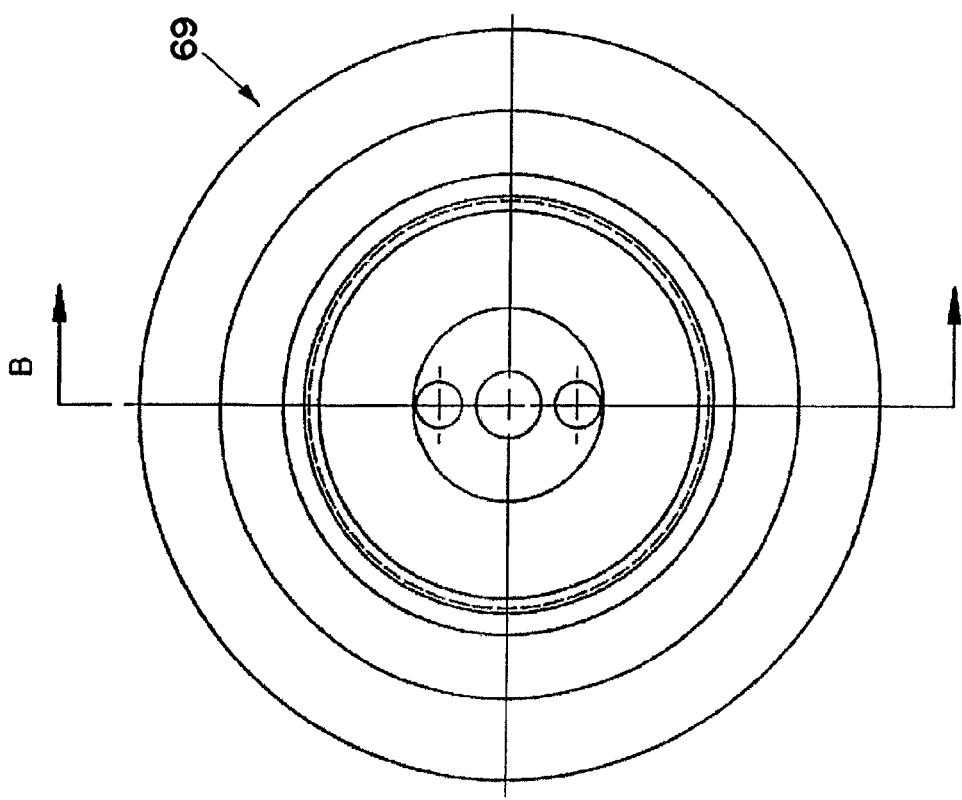
FIG. 7 is an end view of a pole piece adapter used in the valve of FIG. 3.

In FIGS. 7 and 8, the pole piece adapter 69 is shown in greater detail. The connecting portion 76 is internally threaded and the threads can extend axially into the annular deformable portion 78 of the connecting portion. The adapter can also be seen to have annular grooves 90 and 92 on its outer diameter surface for retaining respective annular seals 94 and 96 as seen in FIGS. 1 and 2, which seals seal to the interior surface of the cartridge receptacle in the port body. The pole piece portion 68 of the adapter may also have through bores 97 radially outwardly offset from the center bore 98 to allow hydraulic fluid to pass into the plunger chamber for lubrication and pressure balancing purposes.

In view of the foregoing description, it should now be evident how the limit pressure of the valves can be easily adjusted. The valve can be placed in a test fixture. Pressurized hydraulic fluid is then supplied to the inlet port and the solenoid plunger is moved to its position closest to the valve seat, as by energizing the solenoid coil to the rated maximum value of the valve. While measuring the pressure at the control port, the first and second threaded connecting portions can be relatively rotated until the measured pressure at the control port equals the desired limit pressure. Then, the first and second threaded connecting portions can be fixed against relative rotation by the afore-mentioned crimping operation, i.e. by deforming a portion of one of the threaded connecting portions into a recess in the other threaded connecting portion.

Rotation of the adapter relative to the cage can be effected by gripping and turning a shell enclosing the solenoid. The cage will be held against rotation with the adapter by the frictional resistance between the O-ring seals and the bore surface of the port plate. The fixture may have, for example, a pneumatically driven stake or crimp pin that moves in a guide passage aimed at the tubular extension of the adapter.

Reverting to FIG. 3, the electrical connections between the solenoid coil 64 and terminals 100 are overmolded by a body 101 made of a plastic insulating material such as a thermoplastic polymer, particularly a polyethylene teraphthalate (PET), such as Rynite™ and Crastin™ which are available from E.I. du Pont de Nemours and Company of Wilmington, Del., U.S. As a result, the connections will be encased in a water-tight enclosure that precludes the ingress of water to the connections and thereby avoids otherwise possible corrosion of the electrical connections that may degrade performance and result in premature failure. The body may have formed there a socket 102 for receiving a plug that mates with the exposed portions of the terminals located within the socket. The body may be surrounded by a shell 104 made of metal, for example, that is fixed at its larger diameter end to a cylindrical outer surface of the adapter 69. The fixing may be effected by crimping a portion of the metal shell into an annular groove 106 in the outer surface of the adapter. The shell may have a radially outwardly turned flange 107 that abuts the adapter and provides a shoulder that may be caught by a bracket 108 for securing the valve to the port body by a suitable fastener extending through the fastener hole 109 in the bracket. The shell may be inwardly bent at 110 to capture the body 101 and hold it to the adapter.

Although the invention has been shown and described with respect to a certain embodiment or embodiments, it is obvious that equivalent alterations and modifications will occur to others skilled in the art upon the reading and understanding of this specification and the annexed drawings. In regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A solenoid operated valve comprising:
    a hollow cage configured for insertion into a port block having an inlet passage to which hydraulic fluid can be supplied under pressure from a pump, a control passage for supplying pressurized fluid from the inlet passage to a controlled device under the control of the valve, and a return passage for returning fluid to a tank or return line; the cage having axially spaced apart inlet, control and tank ports respectively for connecting to the inlet passage, control passage and tank passage;
    a spool slidable axially within the cage for controlling a flow of hydraulic fluid from the inlet port to the control port, the spool including a control pressure surface exposed to a control chamber to which pressure may be applied for urging the spool to move within the cage from a position blocking flow from the inlet port to the control port to a position in which the spool allows flow of hydraulic fluid to pass from the inlet port to the control port;
    a pilot valve supply passage allowing a flow of hydraulic fluid from the inlet port to the control chamber and a discharge passage for flow of hydraulic fluid from the control chamber through a valve seat, the valve seat being fixed in relation to the cage;
    a pilot valve member movable into and out of engagement with the valve seat for closing and opening a passage through the valve seat to block or permit flow from the control chamber;
    a solenoid plunger configured to be axially movable under the magnetic influence of a solenoid coil toward the valve seat;
    a pole piece having a proximal end to which the solenoid plunger is drawn under the magnetic influence of the solenoid coil;
    a pusher member interposed between the pilot valve member and the solenoid plunger for biasing the valve member against the valve seat when the solenoid plunger is acted upon by the magnetic influence of the solenoid coil at a given energization, the biasing force acting on the valve member determining the maximum pressure that can be obtained in the control chamber without unseating the pilot valve member from the valve seat;
    a threaded connection between the pole piece and the cage, the threaded connection including a first threaded connecting portion fixed in relation to the pole piece and a second threaded connecting portion fixed in relation to the cage and in threaded engagement with the first threaded portion such that relative rotation of the first and second threaded portions would vary the axial spacing between the proximal end of the pole piece and the valve seat over a range of adjustment; and
    an anti-rotation device interposed between the first and second threaded connecting portions for locking the first and second threaded connecting portions against relative rotation to fix the axial spacing between the proximal end of the pole piece and the valve seat within such range of adjustment, which axial spacing regulates the maximum pressure that can be supplied to the control port.

2. A valve according to claim 1, configured for use as a proportional pressure control cartridge valve, wherein the pusher member includes a pin member interposed between the pilot valve member and the solenoid plunger, the pin member having an axial length such that a minimum gap will be formed between the solenoid plunger and the proximal end of the pole piece when the valve member is seated against the valve seat, whereby when the solenoid plunger is acted upon by the magnetic influence of the solenoid coil at a given energization, the axial width of the gap will determine the level of magnetic attraction between the solenoid plunger and the pole piece and thus the level of force applied by the pin member against the valve member in the direction of the valve seat, which in turn will determine the maximum pressure that can be obtained in the control chamber without unseating the pilot valve member from the valve seat;
    wherein relative rotation of the first and second threaded connecting portions would vary the axial spacing between the proximal end of the pole piece and the valve seat and thereby vary the width of the gap between the solenoid plunger and the proximal end of the pole piece over a range of adjustment; and
    wherein the anti-rotation device locks the first and second threaded connecting portions against relative rotation to provide a gap width within such range of adjustment, which gap width regulates the maximum pressure that can be supplied to the control port.

3. A valve according to claim 1, configured for use as a pressure reducing solenoid valve, wherein the pusher member is a spring, wherein the solenoid plunger under the magnetic influence of the solenoid coil latches against the proximal end of the pole piece, wherein rotation of the first and second threaded portions would vary the axial spacing between the proximal end of the pole piece and the valve seat and thereby vary the compression of the spring when the solenoid plunger is clamped against the pole piece over a range of adjustment; and wherein the anti-rotation device locks the first and second threaded connecting portions against relative rotation to fix the spacing within such range of adjustment, which spacing regulates the maximum pressure that can be supplied to the control port.

4. A valve according to claim 1, wherein the second threaded connecting portion has a radially outwardly opening groove and the first threaded connecting portion has a reduced thickness, axial projection radially outwardly aligned with the groove, and the anti-rotation device is formed by a portion of the axial projection deformed radially inwardly into the groove to create a mechanical interference preventing the first and second threaded connecting portions from rotating relative to one another.

5. A valve according to claim 1, wherein the pole piece is formed by a tubular end portion of an adapter, and the first threaded connecting portion is formed by an internally threaded portion of the adapter.

6. A valve according to claim 5, wherein the second threaded connecting portion is formed by an externally threaded portion of the cage.

7. A valve according to claim 1, wherein the valve seat has a portion thereof threaded into an internally threaded open axial end portion of the cage, with an axial end of the valve seat defining an axial side of the control chamber.

8. A valve according to claim 1, wherein the pilot valve supply passage includes an orifice for producing a pressure drop across the orifice in the flow passing from the inlet port to the control chamber.

9. A method of presetting the limit pressure of a control cartridge valve, wherein the valve comprises a hollow cage configured for insertion into a port block having an inlet passage to which hydraulic fluid can be supplied under pressure from a pump, a control passage for supplying pressurized fluid from the inlet passage to a controlled device under the control of the valve, and a return passage for returning fluid to a tank or return line; the cage having axially spaced apart inlet, control and tank ports respectively for connecting to the inlet passage, control passage and tank passage; a spool slidable axially within the cage for controlling a flow of hydraulic fluid from the inlet port to the control port, the spool including a control pressure surface exposed to a control chamber to which pressure may be applied for urging the spool to move within the cage from a position blocking flow from the inlet port to the control port to a position in which the spool allows flow of hydraulic fluid to pass from the inlet port to the control port; a pilot valve supply passage allowing a flow of hydraulic fluid from the inlet port to the control chamber and a discharge passage for flow of hydraulic fluid from the control chamber through a valve seat, the valve seat being fixed in relation to the cage; a pilot valve member movable into and out of engagement with the valve seat for closing and opening a passage through the valve seat to block or permit flow from the control chamber; a solenoid plunger configured to be axially movable under the magnetic influence of a solenoid coil toward and away from the valve seat; a pole piece having a proximal end to which the solenoid is drawn under the magnetic influence of the solenoid coil; a pusher member interposed between the pilot valve member and the solenoid plunger for biasing the valve member against the valve seat when the solenoid plunger is acted upon by the magnetic influence of the solenoid coil at a given energization, the biasing force acting on the valve member determining the maximum pressure that can be obtained in the control chamber without unseating the pilot valve member from the valve seat; and a threaded connection between the pole piece and the cage, the threaded connection including a first threaded connecting portion fixed in relation to the pole piece and a second threaded connecting portion fixed in relation to the cage and in threaded engagement with the first threaded connecting portion such that relative rotation of the first and second threaded connecting portions varies the axial spacing between the proximal end of the pole piece and the valve seat over a range of adjustment;

the method comprising the steps of:
placing the valve in a test fixture;
supplying pressurized hydraulic fluid to the inlet port;
moving the solenoid plunger to its position closest to the valve seat;
measuring the pressure at the control port;
relatively rotating the first and second threaded connecting portions until the measured pressure at the control port equals the desired limit pressure; and
then fixing the first and second threaded connecting portions against relative rotation.

10. A method according to claim 9, wherein the fixing step is effected by deforming a portion of one of the threaded connecting portions into a groove in the other threaded connecting portion.

11. A method according to claim 10, wherein one of the threaded connecting portions has an annular deformable portion surrounding an axial region of the other threaded connecting portion that has at least one groove into which part of the deformable portion can be mechanically deformed to provide a rotational interference at any one of a plurality of relatively rotated positions of the first and second threaded connecting portions.

12. A solenoid operated valve comprising:
a valve body having axially spaced apart inlet, control and tank ports respectively for connecting to an inlet passage, a control passage and a tank passage;
a spool slidable axially within the valve body for controlling a flow of hydraulic fluid from the inlet port to the control port, the spool including a control pressure surface exposed to a control chamber to which pressure may be applied for urging the spool to move within the cage from a position blocking flow from the inlet port to the control port to a position in which the spool allows flow of hydraulic fluid to pass from the inlet port to the control port;
a pilot valve supply passage allowing a flow of hydraulic fluid from the inlet port to the control chamber and a discharge passage for flow of hydraulic fluid from the control chamber through a valve seat, the valve seat being fixed in relation to the cage;
a pilot valve member movable into and out of engagement with the valve seat for closing and opening a passage through the valve seat to block or permit flow from the control chamber;
a solenoid plunger configured to be axially movable under the magnetic influence of a solenoid coil toward the valve seat;
a pole piece having a proximal end to which the solenoid plunger is drawn under the magnetic influence of the solenoid coil from a position spaced from the pole piece to a position latched to the pole piece;
a spring interposed between the pilot valve member and the solenoid plunger for biasing the valve member against the valve seat when the solenoid plunger is acted upon by the magnetic influence of the solenoid coil at a given energization, the biasing force acting on the valve member determining the maximum pressure that can be obtained in the control chamber without unseating the pilot valve member from the valve seat.

13. A valve according to claim 12, wherein the solenoid plunger, when not subjected to the magnetic influence of the solenoid coil, is movable away from the pole piece a distance such that the spring will not be compressed between the solenoid plunger and pilot valve member.

14. A valve according to claim 12, wherein the pole piece includes an axial hole through which the spring extends.

15. A valve according to claim 14, wherein the spring is a coil spring having a diameter slightly less than the diameter of the axial hole in its uncompressed state.

* * * * *

UNITED STATES PATENT AND TRADEMARK OFFICE
CERTIFICATE OF CORRECTION

PATENT NO.        : 8,375,992 B2                                                                Page 1 of 1
APPLICATION NO.   : 12/097614
DATED             : February 19, 2013
INVENTOR(S)       : Reilly et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1192 days.

Signed and Sealed this
First Day of September, 2015

Michelle K. Lee
*Director of the United States Patent and Trademark Office*